(12) United States Patent
Wang

(10) Patent No.: US 6,675,674 B2
(45) Date of Patent: Jan. 13, 2004

(54) LOCATING/CONTROLLING STRUCTURE FOR TELESCOPIC TUBE

(76) Inventor: Kuang Pin Wang, No. 425, Ta Tun 4th Street, Taichung (TW)

( * ) Notice: Subject to any disclaimer, the term of this patent is extended or adjusted under 35 U.S.C. 154(b) by 78 days.

(21) Appl. No.: 10/143,939

(22) Filed: May 14, 2002

(65) Prior Publication Data

US 2003/0213330 A1 Nov. 20, 2003

(51) Int. Cl.[7] ................................................. G05G 5/16
(52) U.S. Cl. ........................... 74/531; 74/544; 403/384; 16/436
(58) Field of Search .......................... 74/531, 525, 544, 74/546, 548, 551.1–551.7; 403/383; 16/436

(56) References Cited

U.S. PATENT DOCUMENTS

| | | | | |
|---|---|---|---|---|
| 3,620,558 A | * | 11/1971 | MacMillan et al. | 403/290 |
| 5,425,225 A | * | 6/1995 | Franco | 56/332 |
| 5,470,090 A | * | 11/1995 | Stewart eta l. | 280/276 |
| 5,822,837 A | * | 10/1998 | Schwellenbach et al. | 29/450 |
| 6,490,761 B2 | * | 12/2002 | Durrant | 16/436 |
| 6,588,296 B2 | * | 7/2003 | Wessel | 74/502.2 |

* cited by examiner

Primary Examiner—Chong H. Kim
(74) Attorney, Agent, or Firm—Rosenberg, Klein & Lee

(57) ABSTRACT

A locating/controlling structure for telescopic tube including an elliptic outer tube. A rotary button is rotatably disposed at one end of the outer tube. The rotary button is connected with an elliptic rod passing through the outer tube. An inner tube is telescopically nested in the outer tube. One end of the inner tube fitted in the outer tube is provided with a cock body formed with a central circular hole through which the elliptic rod is passed. The cock body has a stop section protruding from the inner tube. The stop section is formed with two radially opposite receptacles. A movable block is disposed in each of the receptacles. Each movable block has a contacting face complementary to the inner circumference of the outer tube. When the rotary button is turned to drive the elliptic rod to rotate about the axis thereof, due to the different diameters of the elliptic rod, the elliptic rod pushes the two movable blocks to radially outward move, whereby the contacting faces of the movable blocks press and abut against the inner circumference of the outer tube to locate the inner and outer tubes.

3 Claims, 6 Drawing Sheets

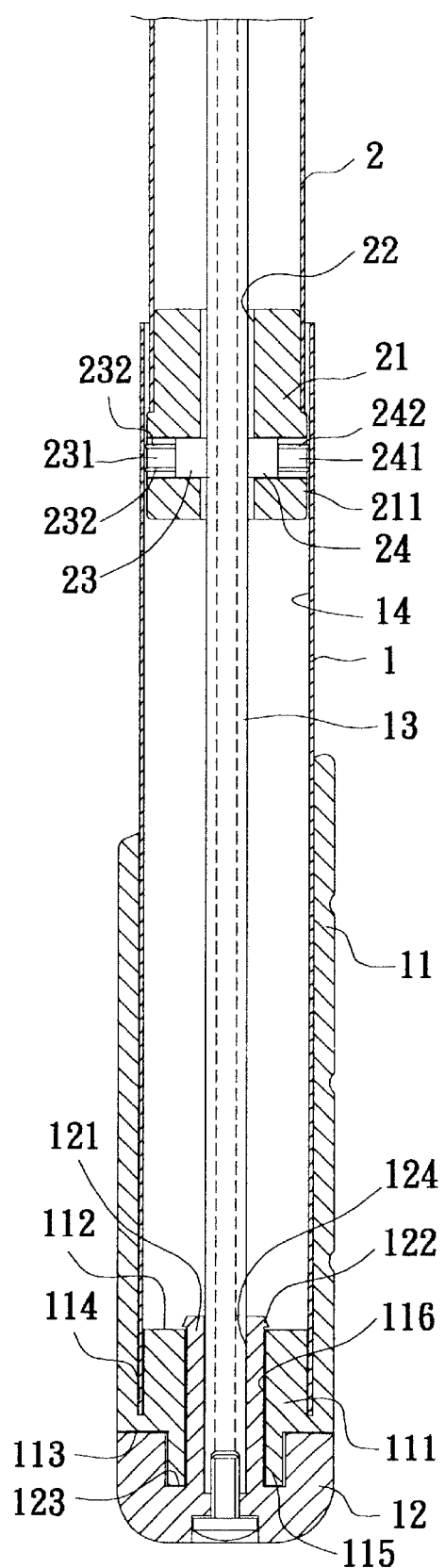
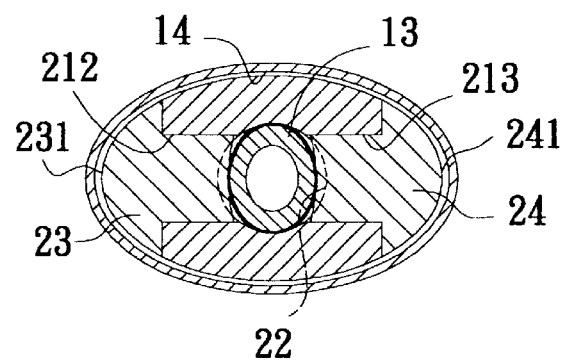
FIG. 4
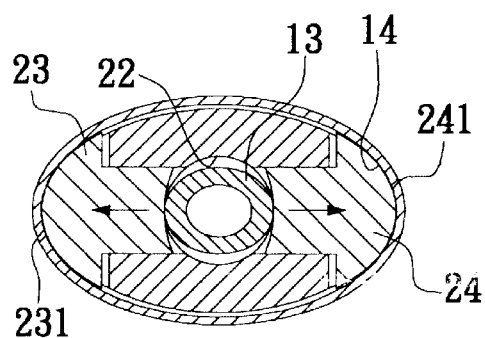
FIG. 5
FIG. 3

US 6,675,674 B2

LOCATING/CONTROLLING STRUCTURE FOR TELESCOPIC TUBE

BACKGROUND OF THE INVENTION

The present invention is related to a locating/controlling structure for telescopic tube, and more particularly to a locating/controlling structure for effectively locating a telescopic tube with elliptic cross-section.

FIG. 6 shows a conventional locating structure for telescopic tube with elliptic cross-section. One end of the outer tube 81 of the telescopic tube 8 is provided with an outer tube fixing seat 82. A base seat 83 is fitted through the outer tube fixing seat 82, whereby the base seat 83 can be rotated thereabout. An elongated bar 84 with square cross-section is connected on the base seat 83. A linking seat 85 is fitted on the elongated bar 84. The linking seat 85 is formed with a square hole 851 through which the elongated bar 84 is passed. When turning the elongated bar 84, the linking seat 85 is driven and rotated along with the elongated bar 84.

The linking seat 85 has a projecting post 852. One end of the projecting post 852 adjacent to the linking seat 85 has an eccentric section 853. An eccentric block 86 with elliptic cross-section is fitted on the eccentric section 853. The other end of the projecting post 852 is formed with an annular hook section 854.

One end of the inner tube 87 fitted in the outer tube 81 is provided with an inner tube fixing seat 88 having a through hole 881 through which the projecting post 852 of the linking seat 85 is fitted. The hook section 854 of the projecting post 852 is engaged with and located on the inner tube fixing seat 88, whereby the linking seat 85 can be rotated within the inner tube fixing seat 88.

According to the above structure, by means of turning the base seat 83, the elongated bar 84 is driven and rotated. At this time, the elongated bar 84 synchronously drives the linking seat 85 to rotate. The eccentric section 853 of the linking seat 85 is eccentrically rotated to push the eccentric block 86 against the inner wall face 811 of the outer tube 81 as shown in FIGS. 7 and 8. By means of the frictional force exerted by the eccentric block 86 against the inner wall face 811, the inner tube 87 is locked with the outer tube 81.

However, the eccentric block 86 should be able to move within the outer tube 81. Therefore, the circumferential length of the eccentric block 86 must be shorter than the circumferential length of the inner wall face 811 of the outer tube 81. In other words, the eccentric block 86 must be a smaller ellipse. Furthermore, the eccentric block 86 is driven by the eccentric section 853 to eccentrically rotate. Therefore, only the outer face of one side of the eccentric block 86 is deflected to about against the inner wall face 811 of the outer tube 81 as shown in FIG. 8. As a result, the smaller elliptic eccentric block 86 only contacts with the inner wall face 811 of the larger outer tube by a small contacting area. Therefore, the locating force is insufficient.

The outer face of one side of the eccentric block 86 is deflected to abut against the inner wall face 811 of the outer tube 81 so as to provide a locating force. However, the inner wall face 811 exerts a reaction force onto the inner tube 87 to push the same toward the other side as shown in FIG. 7. Therefore, the inner tube 87 is deflected from the outer tube 81 and unevenly suffers force. This affects the locating strength of the inner tube 87 and the outer tube 81. Moreover, with one side of the inner tube 87 deflected to abut against the outer tube 81, when using the telescopic tube, in the case that the inner tube 87 suffers a greater force, the inner tube 87 will be deflected and inclined from the outer tube 81 as shown in FIG. 9. In the case that the telescopic tube is connected with a cutting or shearing tool, the strength and application force of the inner and outer tubes 87, 81 will be affected.

SUMMARY OF THE INVENTION

It is therefore a primary object of the present invention to provide a locating/controlling structure for telescopic tube. A rotary button is rotatably disposed at one end of the outer tube. The rotary button is connected with an elliptic rod passing through the outer tube. An inner tube is telescopically nested in the outer tube. One end of the inner tube fitted in the outer tube is provided with a cock body formed with a central circular hole through which the elliptic rod is passed. The cock body has a stop section protruding from the inner tube. The stop section is formed with two radially opposite receptacles. A movable block is disposed in each of the receptacles. Each movable block has a contacting face complementary to the inner circumference of the outer tube. When the rotary button is turned to drive the elliptic rod to rotate about the axis thereof, due to the different diameters of the elliptic rod, the elliptic rod pushes the two movable blocks to synchronously radially outward move, whereby the contacting faces of the movable blocks press and abut against the inner circumference of the outer tube to firmly locate the inner and outer tubes.

It is a further object of the present invention to provide the above locating/controlling structure for telescopic tube, in which the contacting face of each movable block is formed with slipproof ribs so as to increase the frictional force between the contacting faces and the inner circumference of the outer tube and thus enhance locating effect for the inner and outer tubes.

It is still a further object of the present invention to provide the above locating/controlling structure for telescopic tube, in which rotary button is rotatably connected with the handle to form an assembly. Therefore, the locating/controlling structure includes fewer components and can be more quickly assembled so as to reduce the problem of tolerance of clearance caused by assembly of numerous parts. Accordingly, the reliability of the telescopic tube is increased and the processing cost is lowered.

The present invention can be best understood through the following description and accompanying drawings wherein:

BRIEF DESCRIPTION OF THE DRAWINGS

FIG. 3 is a sectional view taken along line 3—3 of FIG. 2;

FIG. 4 is a sectional view taken along line 4—4 of FIG. 2;

FIG. 5 is a sectional view showing that the elliptic rod pushes the two movable blocks to abut against the inner circumference of the outer tube of the present invention;

DETAILED DESCRIPTION OF THE PREFERRED EMBODIMENT

Figure 1:
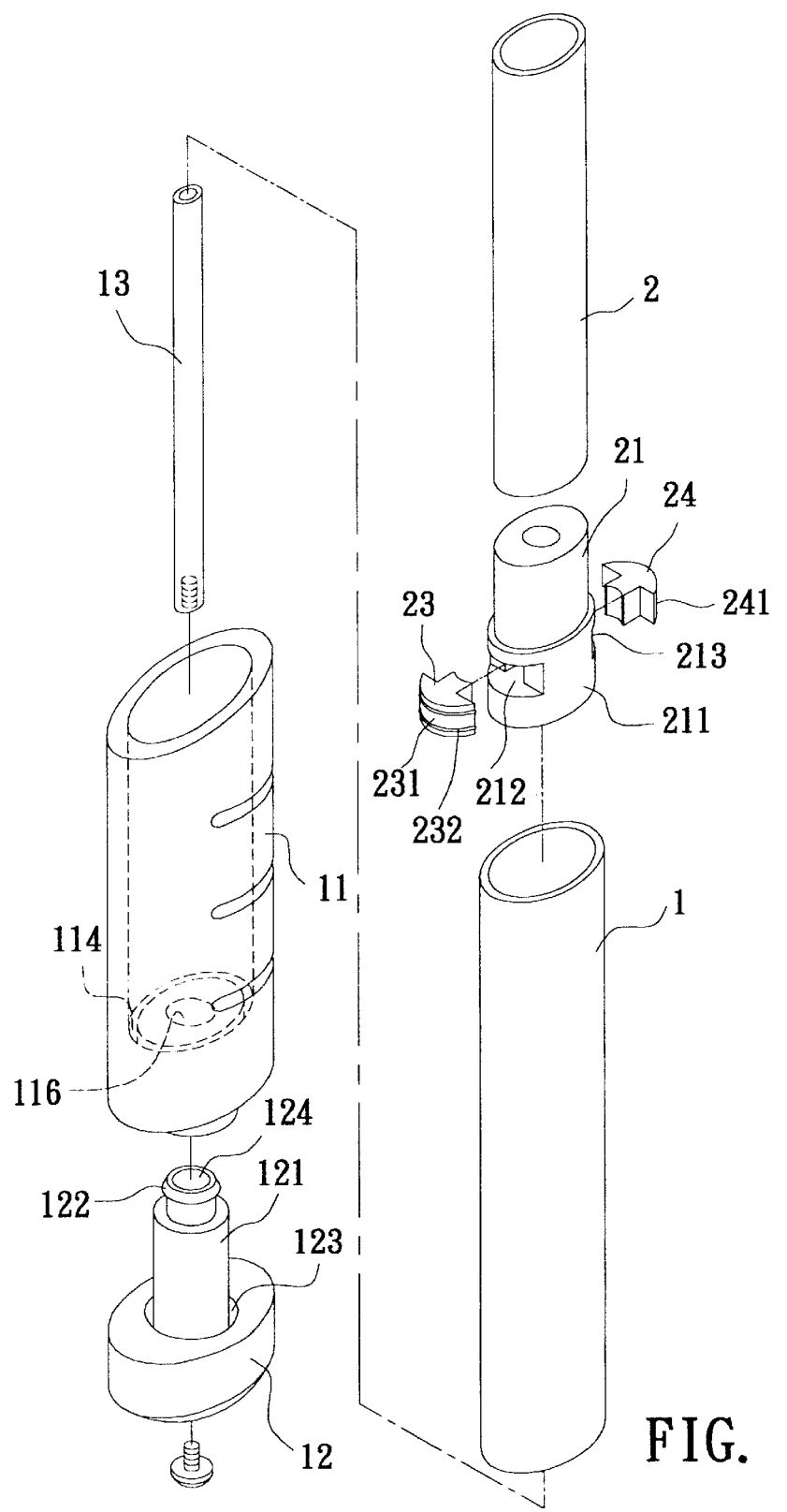
FIG. 1 is a perspective exploded view of the present invention.
Figure 2:
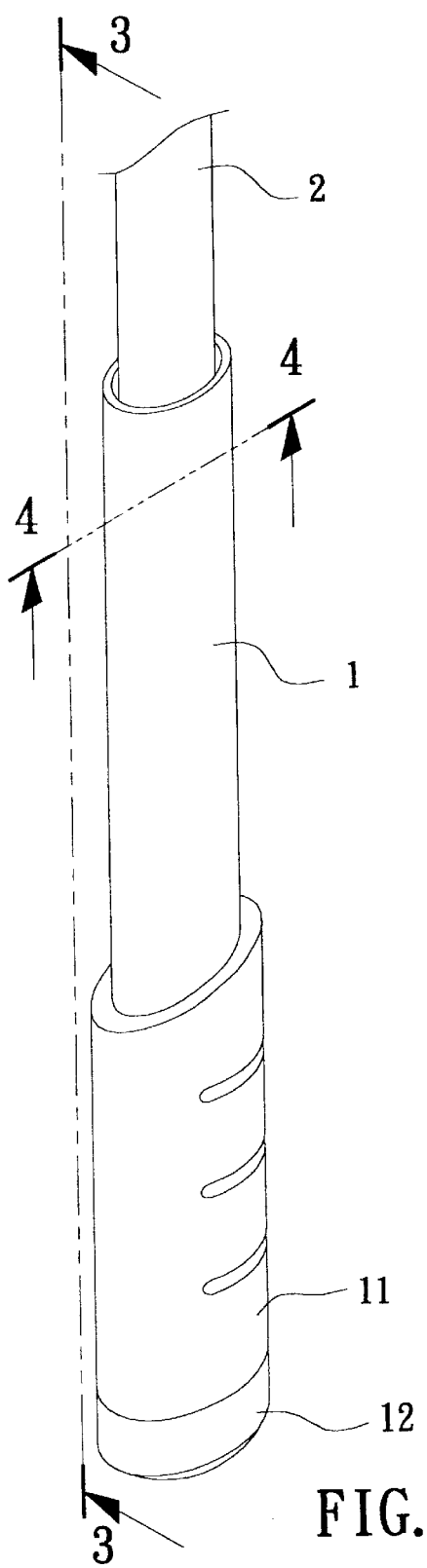
FIG. 2 is a perspective assembled view of the present invention.
Figure 6:
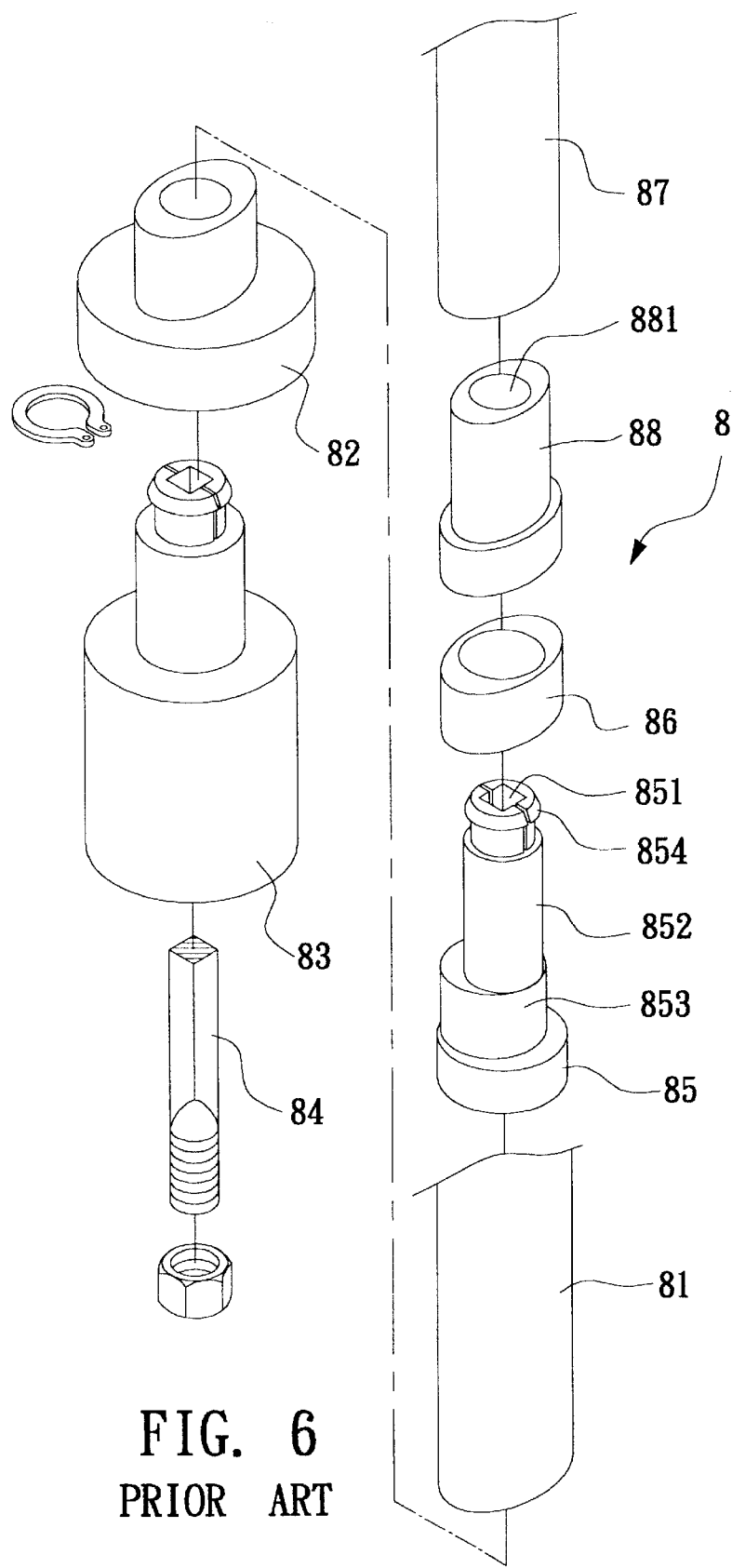
FIG. 6 is a perspective exploded view of a conventional locating structure for elliptic telescopic tube.
Figures 7, 8:
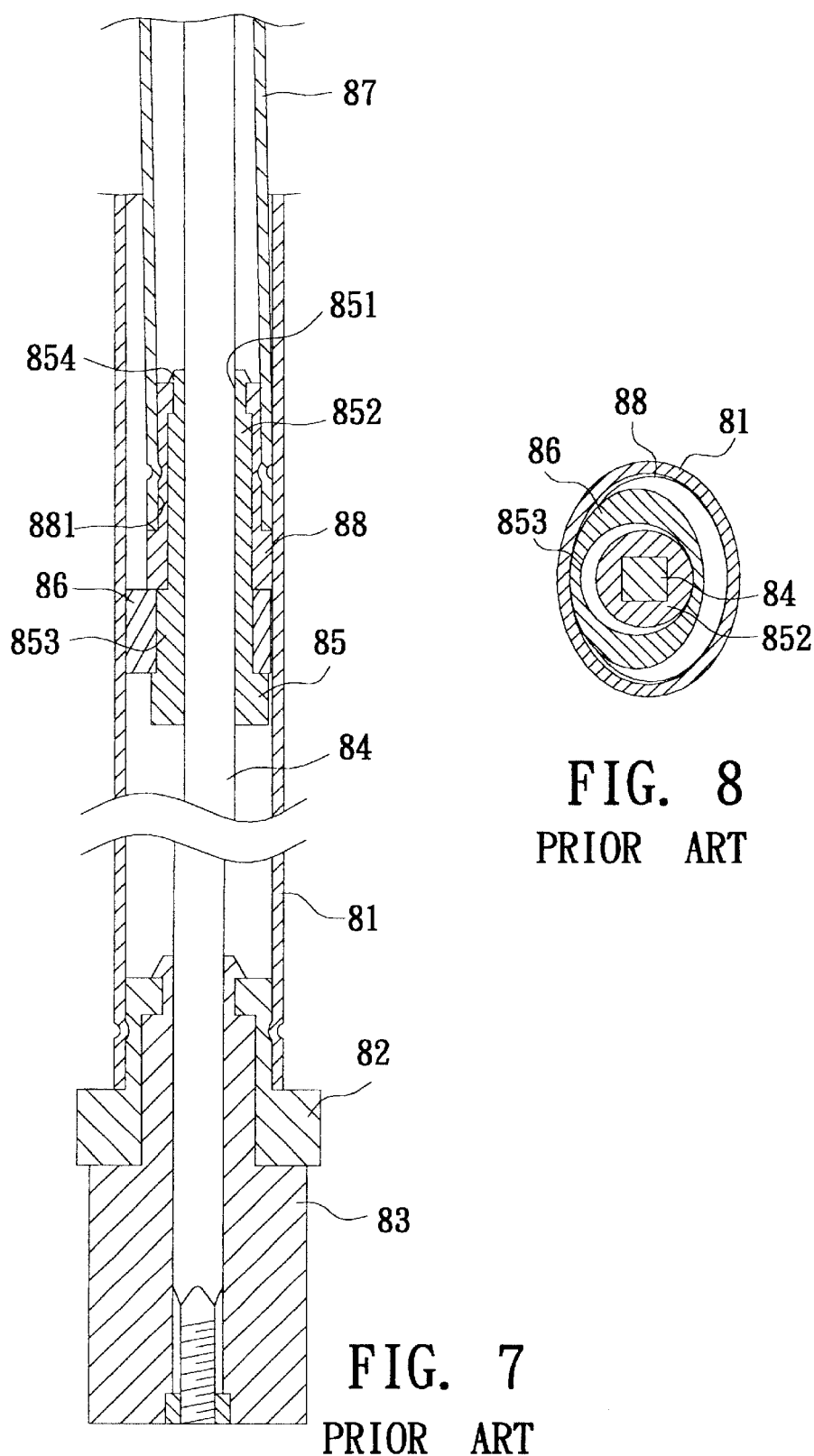
FIG. 7 is a longitudinal sectional view of the conventional locating structure for elliptic telescopic tube in a located state.
FIG. 8 is a cross-sectional view of the conventional locating structure for elliptic telescopic tube in a located state.
Figure 9:
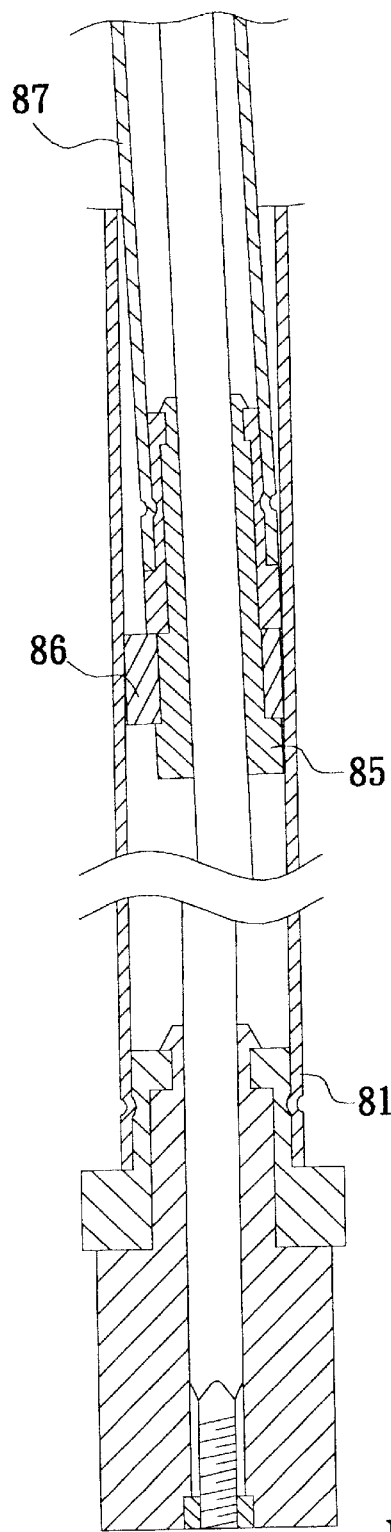
FIG. 9 is a longitudinal sectional view of the conventional locating structure for elliptic telescopic tube, showing that the inner and outer tubes are deflected and inclined.

Please refer to FIGS. 1 to 4. The locating structure for telescopic tube of the present invention includes an outer tube 1 and an inner tube 2 telescopically nested in the outer tube 1. The outer and inner tubes 1, 2 have elliptic cross-sections.

A handle 11 is fitted on one end of the outer tube 1. The handle 11 has a close end 111 formed with a through hole 116. In addition, the close end 111 has an inner face 112 and an outer face 113. The inner face 112 is formed with an annular groove 114 in which one end of the outer tube 1 is inlaid. The outer face 113 is formed with an annular stop wall 115 projecting from the circumference of the through hole 116.

A rotary button 12 is rotatably disposed at the close end 111 of the handle 11. The rotary button 12 is formed with a projecting post 121 in cooperation with the through hole 116. One end of the projecting post 121 distal from the rotary button 12 has an annular engaging hook 122. The projecting post 121 can be passed through the through hole 116 to engage the engaging hook 122 with the inner face 112 of the close end 111. The rotary button 12 is formed with an annular engaging groove 123 corresponding to the stop wall 115.

The center of the rotary button 12 is formed with an elliptic hole 124 in which an elliptic rod 13 is inserted. The elliptic rod 13 passes through the outer tube 1 and extends in axial direction of the outer tube 1. The inner tube 2 is fitted in the other end of the outer tube 1. One end of the inner tube 2 fitted in the outer tube 1 is provided with a cock body 21 formed with a central circular hole 22 through which the elliptic rod 13 is passed. In addition, the cock body 21 has a stop section 211 protruding from the inner tube 2. The stop section 211 has a cross-section with a shape corresponding to the inner circumference 14 of the outer tube 1. The stop section 211 is formed with two radially opposite receptacles 212, 213 respectively radially outward passing through the stop section 211 from the circular hole 22. A movable block 23, 24 is disposed in each of the receptacles 212, 213. Each movable block 23, 24 has a contacting face 231, 241 complementary to the inner circumference 14 of the outer tube 1. Each contacting face 231, 241 is formed with two slipproof ribs 232, 242.

Referring to FIG. 5, in use, the inner and outer tubes 2, 1 are relatively moved to a necessary length. Then the rotary button 12 is turned to drive the elliptic rod 13 to rotate about the axis thereof. The cross-section of the elliptic rod 13 has unequal diameters in x axis and y axis. Therefore, when the elliptic rod 13 is rotated, the diameter thereof changes to radially outward push the two movable blocks 23, 24, whereby the contacting faces 231, 241 of the movable blocks 23, 24 press the inner circumference 14 of the outer tube 1. Accordingly, the contacting faces 231, 241 abut against the inner circumference 14 of the outer tube 1 to exert a frictional force thereon so as to locate the inner tube 2.

The elliptic rod 13 is rotatable within the circular hole 22 of the cock body 21. Therefore, when the elliptic rod 13 is rotated, the two movable blocks 23, 24 are synchronously pushed outward. Moreover, the two movable blocks 23, 24 are radially moved. Therefore, the contacting faces 231, 241 of the movable blocks 23, 24 are complementary to the inner circumference 14 of the outer tube 1. Accordingly, the contacting faces 231, 241 of the movable blocks 23, 24 abut against the inner circumference 14 of the outer tube 1 by considerably large contacting area. By means of the large contacting area, the locating force for the inner and outer tubes 2, 1 is greatly increased. Moreover, the contacting faces 231, 241 are formed with slipproof ribs 232, 242 so as to increase the frictional force between the contacting faces 231, 241 and the inner circumference 14. Therefore, the inner and outer tubes 2, 1 are more firmly located.

Furthermore, two movable blocks 23, 24 are radially oppositely moved to make the contacting faces 231, 241 thereof abut against the inner circumference 14 of the outer tube 1. Therefore, the inner and outer tubes 2, 1 will not be deflected or bent as in the conventional structure. In addition, the eccentric section or eccentric block of the conventional structure is unnecessary in the locating structure of the present invention. Accordingly, the locating structure of the present invention is more reliable and simplified. Therefore, it is easier to manufacture the present invention and the manufacturing cost thereof is lower.

The above embodiment is only used to illustrate the present invention, not intended to limit the scope thereof. Many modifications of the above embodiment can be made without departing from the spirit of the present invention.

What is claimed is:

1. A locating/controlling structure for telescopic tube comprising an outer tube and an inner tube telescopically nested in the outer tube, the outer tube having an elliptic cross-section, a handle being fitted on one end of the outer tube, the handle having a close end having an inner face and an outer face, the inner face being formed with an annular groove in which one end of the outer tube is inlaid, the close end being formed with a through hole in which a rotary button is rotatably disposed, the rotary button being formed with a projecting post in cooperation with the through hole, one end of the projecting post distal from the rotary button having an annular engaging hook, whereby the projecting post can be passed through the through hole to engage the engaging hook with the inner face of the close end of the handle, the rotary button being connected with an elliptic rod passing through the outer tube and extending in axial direction of the outer tube, the inner tube having an elliptic cross-section and being fitted in the other end of the outer tube, one end of the inner tube fitted in the outer tube being provided with a cock body formed with a central circular hole through which the elliptic rod is passed, the cock body having a stop section protruding from the inner tube, the stop section having a cross-section with a shape corresponding to inner circumference of the outer tube, the stop section being formed with two radially opposite receptacles respectively radially outward passing through the stop section from the circular hole, a movable block being disposed in each of the receptacles, each movable block having a contacting face complementary to the inner circumference of the outer tube, when the rotary button is turned to drive the elliptic rod to rotate about the axis thereof, the elliptic rod pushing the two movable blocks to radially outward move, whereby the contacting faces of the movable blocks press and abut against the inner circumference of the outer tube.

2. The locating/controlling structure for telescopic tube as claimed in claim 1, wherein the contacting face of each movable block is formed with more than one slipproof rib.

3. The locating/controlling structure for telescopic tube as claimed in claim 1, wherein the outer face of the close end of the outer tube is formed with an annular stop wall projecting from the circumference of the through hole, the rotary button being formed with an annular engaging groove corresponding to the stop wall.

* * * * *